US008456952B2

(12) United States Patent
Tang et al.

(10) Patent No.: US 8,456,952 B2
(45) Date of Patent: Jun. 4, 2013

(54) CURVE-FITTING TECHNIQUE FOR DETERMINING DISPERSION CHARACTERISTICS OF GUIDED ELASTIC WAVES

(75) Inventors: Xiao Ming Tang, Sugar Land, TX (US); Chen Li, Katy, TX (US); Douglas J. Patterson, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 865 days.

(21) Appl. No.: 12/571,671

(22) Filed: Oct. 1, 2009

(65) Prior Publication Data

US 2010/0085835 A1    Apr. 8, 2010

Related U.S. Application Data

(60) Provisional application No. 61/102,506, filed on Oct. 3, 2008.

(51) Int. Cl.
*G01V 1/32*    (2006.01)
(52) U.S. Cl.
USPC ......................................................... 367/49
(58) Field of Classification Search
CPC ............ G01V 2210/44; G01V 2210/47; G01V 2210/582
USPC ......................................................... 367/49
See application file for complete search history.

(56) References Cited

U.S. PATENT DOCUMENTS

| | | | |
|---|---|---|---|
| 5,278,805 A * | 1/1994 | Kimball | 367/32 |
| 5,703,772 A | 12/1997 | Beard | |
| 5,873,051 A | 2/1999 | Van Bemmel et al. | |
| 6,930,616 B2 | 8/2005 | Tang et al. | |
| 7,698,066 B2 * | 4/2010 | Huang et al. | 702/14 |
| 2004/0073371 A1 | 4/2004 | Haugland | |
| 2005/0261835 A1 * | 11/2005 | Wang | 702/6 |
| 2008/0027650 A1 | 1/2008 | Huang et al. | |

FOREIGN PATENT DOCUMENTS

| WO | 2006078416 A2 | 7/2006 |
|---|---|---|
| WO | 2007149522 | 12/2007 |

OTHER PUBLICATIONS

Wikipedia contributors. Hyperbolic function. Wikipedia, The Free Encyclopedia. Sep. 26, 2008. Available at: http://en.wikipedia.org/w/index.php?title=Hyperbolic_function&oldid=496181733. Accessed Aug. 14, 2012.*
Wikipedia contributors. Inverse trigonometric functions. Wikipedia, The Free Encyclopedia. Sep. 26, 2008. Available at: http://en.wikipedia.org/w/index.php?title=Inverse_trigonometric_functions&oldid=241087365. Accessed Aug. 14, 2012.*

(Continued)

*Primary Examiner* — Mark Hellner
*Assistant Examiner* — Ari M Diacou
(74) *Attorney, Agent, or Firm* — Cantor Colburn LLP (57) ABSTRACT

A method for estimating a slowness of an earth formation, the method including: transmitting acoustic energy into the earth formation using an acoustic source; receiving the acoustic energy with an array of acoustic receivers, each acoustic receiver being configured to provide acoustic waveform data related to the received acoustic energy; transforming the acoustic waveform data into a frequency domain to provide frequency domain data; calculating a slowness-frequency coherence function using the frequency domain data; selecting slowness dispersion data from peaks of the slowness-frequency coherence function; fitting a curve to the slowness dispersion data; and estimating the slowness from the curve.

20 Claims, 8 Drawing Sheets

OTHER PUBLICATIONS

Quantitative Borehole Acoustic Methods; by X.M. Tang, A. Cheng; ISBN-13: 9780080440514 Pub. Date: Jan. 2004 Publisher: Elsevier Science. Series: Handbook of Geophysical Exploration: Seismic Exploration Series , #24. Chapters 2-3.*

Nolte, B., Rao, R. V. N., and Huang, X., 1997, Dispersion analysis of spilit flexural waves: M.I.T. Borehole Acoustics and Logging and Reservoir Delineation Consortia Annual Report.*

Ocean Drilling Program: Overview of Logging Tools: Measurements, Units and Acronyms. Jan. 2004. http://www.odplegacy.org/PDF/Operations/Engineering/Logging_Tools/Acronyms_Overview.pdf Accessed: Jul. 13, 2012.*

Marek Z.Kozak, Mirka E.Kozak, Magnetic Pulse Inc. Estimation of Formation Shear Slowness Using Phase Velocity and Semblance Method—Comparative Studies. Society of Exploration Geophysicists. 2001 SEG Annual Meeting, Sep. 9-14, 2001.*

S. W. Lang, A. L. Kurkjian, J. H. McClellan, C. F. Morris and T. W. Parks. Estimating slowness dispersion from arrays of sonic logging waveforms. Geophysics(Apr. 1987), 52(4):530-544 doi: 10.1190/1.1442322.*

Press, William H.; Teukolsky, Saul A.; Vetterling, William T.; Flannery, Brian P. Numerical Recipes in Fortran. The Art of Scientific Computing, 2nd Edition, 1992, Cambridge University Press.*

Karl J. Ellefsen, M. Nafi Toksoz, K. M. Tubman and C. H. Cheng. Estimating a shear modulus of a transversely isotropic formation. Geophysics (Nov. 1992), 57(11):1428-1434. doi: 10.1190/1.1443210.*

Tang, X. M., Dubinsky, V., Wang, T., Bolshakov, A., and Patterson, D., 2003, Shear-velocity measurement in the Logging-While-Drilling environment: Modeling and fieldevaluations: Petrophysics, 44, 79-90.

Cheng, C. H., and Toksoz, M. N., 1981, Elastic wave propagation in a fluid-filled boreholeand synthetic acoustic logs: Geophysics, 56, 1603-1613.

Chunduru, R. K., Sen, M. K., and Stoffa, P. L., 1996, 2-d resistivity inversion using splineparameterization and simulated annealing: Geophysics, 61, 151-161.

Dubinsky, V., Tang, X., Bolshakov, A., and Patterson, D., 2003, Engineering aspects ofLWD quadrupole measurements and field test results, Paper 84248, SPE Annual TechnicalConference and Exhibition.

Geerits, T. W. and Tang, X., 2003, Centroid phase slowness as a tool for dispersioncorrection of dipole acoustic logging data: Geophysics, Soc. of Expl. Geophys., 68, 101-107.

Huang, X., and Yin, H., 2005, A data-driven approach to extract shear and compressionalslowness from dispersive waveform data: 75th Annual International Meeting, SEG, Expanded Abstracts , 384-387.

Kimball, C. V., 1998, Shear slowness measurement by dispersive processing of boreholeflexural mode: Geophysics, 63, 337-344.

Kimball, C. V., and Marzetta, T. L., 1984, Semblance processing of borehole acousticarray data: Geophysics, 49, No. 3, 274-281.

Lou, M., and S. Crampin, 1992, Guided-wave propagation between boreholes: TheLeading Edge, 11 , No. 7, 34-37.

Tang, X. M., Dubinsky, V., and Patterson, D., 2006, Development of a low-frequencyLWD quadrupole shear-wave technology to improve quality of formation shear velocitymeasurement, Paper 102335, SPE Annual Technical Conference and Exhibition.

Tang, X. M., Zheng, Y., and Dubinsky, V., 2005, Logging while drilling acousticmeasurement in unconsolidated slow formations, paper R, in 46th Annual LoggingSymposium Transactions, Society of Professional Well Log Analysts.

Tang, X., Wang, T. And Patterson, D., 2002, Multipole acoustic logging-while-drilling,72nd Ann. Internat. Mtg: Soc. of Expl. Geophys., 364-367.

Zheng, Y., Huang, X., Tang, X., Patterson, D., and Yin, H., 2006, Application of a newdata-driven dispersive processing method to LWD compressional and shear waveformdata, Paper 103328, SPE Annual Technical Conference and Exhibition.

Preliminary Report on Patentability and Written Opinion, Mailed Apr. 14, 2011, International Appln. No. PCT/US2009/059427, Written Opinion 3 pages.

Ewing et al. "Elastic Waves in Layered Media", 1957, W.McGraw-Hill., New York, pp. 1-6.

Hornby et al. "Analysis of Full-Waveform Sonic Data Acquired in Unconsolidated Gas Sands" Petrophysics, 2000, 41, 363-374.

Ingber, Lester "Very Fast Simulated Re-Annealing" Journal of Math. Computation, 1989, 12, 967-973.

Schmitt, D. P., 1988, Shear-wave logging in elastic formations: J. Acoust. Soc. Am., 84, pp. 2215-2229.

* cited by examiner

CURVE-FITTING TECHNIQUE FOR DETERMINING DISPERSION CHARACTERISTICS OF GUIDED ELASTIC WAVES

BACKGROUND OF THE INVENTION

1. Field of the Invention

The present invention relates to determining a property of an earth formation, and in particular to measuring acoustic waves to determine the property.

2. Description of the Related Art

Obtaining accurate formation compressional and shear velocity from acoustic logging measurements is important for various geophysical and petroleum engineering applications. A challenge for processing acoustic data, whether the data is from wireline or LWD (logging while drilling) measurements, is how to correctly handle the dispersion effect of the waveform data, because the dispersion effect is the fundamental nature of elastic wave propagation in a waveguide such as a borehole penetrating an earth formation. In general, the wave dispersion characteristics are governed by the dispersion equation (Tang, X., Wang, T. and Patterson, D., 2002, Multipole acoustic logging-while-drilling, 72nd Ann Internat. Mtg: Soc. of Expl. Geophys., 364-367):

$$D(k, \omega, \text{Model}) = 0 \quad (1)$$

where k is wavenumber and w is angular frequency, and "Model" refers to the borehole waveguide structure model consisting of borehole fluid, formation, and a logging tool. For example, in the case of LWD, the structure model includes an LWD acoustic tool that occupies a large part of the borehole. The presence of the LWD tool significantly changes the dispersion characteristics, as compared to the wireline case where the tool effect is less significant. Solving the dispersion equation for each frequency, we find the wavenumber k for a guided wave mode, from which the wave phase velocity or slowness (inverse of velocity) is obtained as $$V(\omega) = \omega/k, \text{ or } S(\omega) = 1/V(\omega) = k/\omega \quad (2)$$

Using the above approach we can calculate the theoretical dispersion curve for the wireline dipole-flexural waves (Schmitt, D. P., 1988, Shear-wave logging in elastic formations: *J. Acoust. Soc. Am.*, 84, 2215-2229) and LWD quadrupole waves (Tang et al., 2002), etc. The above dispersion equation can also be used to calculate the dispersion curve for leaky-P waves, whose dispersion effect becomes quite significant for acoustic logging in a low-velocity formation (for wireline case, see Hornby, B. E., and Pasternark, E. S., 2000, Analysis of full-waveform sonic data acquired in unconsolidated gas sands: *Petrophysics,* 41, 363-374; for LWD case, see Tang, X. M., Zheng, Y., and Dubinsky, V., 2005, Logging while drilling acoustic measurement in unconsolidated slow formations, paper R, in 46th Annual Logging Symposium Transactions, Society of Professional Well Log Analysts).

The theoretical dispersion equation shows that the dispersion curve of a guided wave involves numerous model parameters. Even in the simplest case of a fluid-filled borehole without tool, six parameters are needed to calculate the dispersion curve (i.e., borehole size, formation P- and S-velocities and density, and fluid velocity and density). In an actual logging environment, other unknown or uncontrollable influences (or parameters), such as changing fluid property, tool off-centering, borehole rugosity, formation alteration, etc., can also alter the dispersion characteristics. Because of these complexities, modeled-based dispersion estimation (e.g., Kimball, C. V., 1998, Shear slowness measurement by dispersive processing of borehole flexural mode: *Geophysics,* 63, 337-344; Geerits, T. W. and Tang, X., 2003, Centroid phase slowness as a tool for dispersion correction of dipole acoustic logging data: Geophysics, Soc. of Expl. Geophys., 68, 101-107) may suffer significant errors if the borehole condition is far from the assumed ideal theoretical condition.

To address the drawbacks of the model-based dispersion estimation methods, a data-driven method was recently developed (Huang, X., and Yin, H., 2005, A data-driven approach to extract shear and compressional slowness from dispersive waveform data: 75th Annual International Meeting, SEG, Expanded Abstracts, 384-387) and subsequently improved in the data processing practice (Zheng, Y., Huang, X., Tang, X., Patterson, D., and Yin, H., 2006, Application of a new data-driven dispersive processing method to LWD compressional and shear waveform data, Paper 103328, SPE Annual Technical Conference and Exhibition). The data driven method does not use the full theoretical modeling. Instead, it uses a common characteristic of guided waves. That is, at low frequencies, the dispersion curve of a guided wave becomes flat and reaches the formation (P or S) velocity. The flat portion of the curve, when discretized and counted over small frequency intervals, tends to have higher probability of event occurrence over the steep portion of the curve. Thus, by projecting the counted events onto the slowness axis to form a population distribution, or histogram, and detecting edge of the peak distribution, the true formation slowness that is free of dispersion effect can be estimated. A drawback of the histogram approach is that data noise and/or mode interference tend to create spurious histogram peaks and mislead the edge detection process.

Therefore, what are needed are techniques to determine accurate compressional and shear velocity of an earth formation. Preferably, the techniques use an accurate dispersion estimation method.

BRIEF SUMMARY OF THE INVENTION

Disclosed is a method for estimating a slowness of an earth formation, the method including: transmitting acoustic energy into the earth formation using an acoustic source; receiving the acoustic energy with an array of acoustic receivers, each acoustic receiver being configured to provide acoustic waveform data related to the received acoustic energy; transforming the acoustic waveform data into a frequency domain to provide frequency domain data; calculating a slowness-frequency coherence function using the frequency domain data; selecting slowness dispersion data from peaks of the slowness-frequency coherence function; fitting a curve to the slowness dispersion data; and estimating the slowness from the curve.

Also disclosed is an apparatus for estimating a slowness of an earth formation, the apparatus having: an acoustic source configured to transmit acoustic energy into the earth formation; an array of acoustic receivers configured to receive the acoustic energy, each acoustic receiver being configured to provide acoustic waveform data related to the received acoustic energy; and a processing system configured to implement a method comprising: transforming the acoustic waveform data into a frequency domain to provide frequency domain data; calculating a slowness-frequency coherence function using the frequency domain data; selecting slowness dispersion data from peaks of the slowness-frequency coherence function; fitting a curve to the slowness dispersion data; and estimating the slowness from the curve.

Further disclosed is a computer-readable medium comprising computer-readable instructions for estimating a slowness of an earth formation, by implementing a method including: transmitting acoustic energy into the earth formation using an acoustic source; receiving the acoustic energy with an array of acoustic receivers, each acoustic receiver being configured to provide acoustic waveform data related to the received acoustic energy; transforming the acoustic waveform data into a frequency domain to provide frequency domain data; calculating a slowness-frequency coherence function using the frequency domain data; selecting slowness dispersion data from peaks of the slowness-frequency coherence function; fitting a curve to the slowness dispersion data; and estimating the slowness from the curve.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

Disclosed are embodiments of techniques for a data-driven dispersion analysis to overcome drawbacks of a histogram approach to dispersion estimation. Specifically, the approach disclosed herein constitutes using an analytical curve to fit the actual dispersion data. For the curve-fitting method, the fitting curve needs to fit not only the "flat" (i.e., the low-frequency) portion, but also the dispersive (frequency-varying) portion, of the entire dispersion data, reducing the effects of data outliers (noise) that cause the spurious histogram peaks. One example of novelty of the technique is that, unlike the theoretical dispersion curve (equations (1) and (2)) that have numerous model parameters, the fitting curve disclosed herein contains a minimal set of only four parameters and is able to capture the dispersion characteristics of a variety of guided wave modes. As will be shown in the later application examples, this technique has been successfully applied to wireline dipole flexural wave data, LWD leaky-P data, and LWD quadrupole shear wave data. The details of the technique are elaborated below.

Curve-Fitting Dispersion Analysis Method

Given an array of acoustic logging waveform data of a dispersive guided wave mode, $X_n(t)$, (n=1, 2, ..., N), recorded by an array acoustic tool with N equally-spaced receivers, we want to estimate formation slowness from the array data. Conventional slowness processing of the dispersive array waveform data using semblance (Kimball, C. V., and Marzetta, T. L., 1984, Semblance processing of borehole acoustic array data: Geophysics, 49, no. 3, 274-281) is known to suffer from the dispersion effect and results in overestimating the slowness value (Geerits and Tang, 2003). The dispersion characteristics of the array data can be estimated using a method described below.

We first calculate the array spectral data, $X_n(\omega)$, (n=1, 2, ..., N), obtained by Fourier-transforming the waveform traces into frequency domain From the spectral data, we calculate the slowness-frequency coherence function from the spectral data using the following equation (Tang, X. M., and Cheng, C. H., 2004: *Quantitative borehole acoustic methods*, Elsevier)

$$\rho(\omega, s) = \frac{\left|\sum_{n=1}^{N} X_n^*(\omega)e^{i\omega(n-1)sd}\right|}{\sqrt{N \sum_{n=1}^{N} X_n^*(\omega)X_n(\omega)}}, \quad (3)$$

where $\omega$ is angular frequency and d is receiver spacing, and * denotes taking the complex conjugate; the two vertical bars |•| denotes taking the absolute value of the quantity inside the bars. Assume that the spectral data $X_n(\omega)$ corresponds to an acoustic wave mode with a dispersive slowness $S(\omega)$. The wave mode travels across each receiver in the array as:

$$X_n(\omega) = A(\omega)e^{-i\omega(n-1)S(\omega)d}. \quad (4)$$

We see that if the slowness variable, s, attains the value of $S(\omega)$ for a given $\omega$, then the phase of $X_n^*(\omega)e^{-i\omega(n-1)sd}$ in equation (3) will be canceled and the coherence value will be maximized (the value will approach 1 if the data are noise-free). Thus, by finding the peak of the coherence function along the s-axis for each $\omega$, the data dispersion curve $S(\omega)$ can be estimated.

Estimating the data dispersion curve in the presence of significant data noise and/or mode interference, however, may result in the curve having large scatters or outliers. The situation will be aggravated especially when the wave mode's amplitude spectrum $A(\omega)$ is small, as is usually the case near the cut-off frequency where we want to estimate the formation (P or S) slowness from the guided-wave data. Thus, estimating formation slowness from low-frequency value(s) of the dispersion data will suffer large errors. On the other hand, fitting the dispersion data with an appropriate dispersion function is a better approach because curve fitting can exclude the outliers and suppress the effects of noise. In the following, we discuss the use of a curve-fitting technique for estimating the guided-wave dispersion characteristics and determining the formation slowness.

Selecting an appropriate fitting function is the key for the curve-fitting technique. We start with observing the common dispersion characteristics of a guide wave mode in borehole. We first discuss the "shear mode" characteristics. The shear mode refers to a guided mode whose phase velocity is lower than the formation shear velocity. Examples of this type of wave mode include pseudo-Raleigh waves in monopole logging (Cheng, C. H., and Toksöz, M. N., 1981, Elastic wave propagation in a fluid-filled borehole and synthetic acoustic logs: *Geophysics*, 56, 1603-1613), flexural waves in (wireline) dipole logging (Schmitt, 1998), and screw waves in quadrupole logging (Tang and Cheng, 2004), etc. The shear mode reaches the formation shear velocity toward its low-frequency end, i.e., the cut-off frequency. In the high-frequency limit, the wave velocity approaches the Scholte-wave velocity for a planar solid-fluid interface. Between the low- and high-frequency limits, the dispersion curve monotonically changes with frequency. The rate of change, which controls the steepness of the curve, depends on various formation/fluid and tool parameters as well as the type of source excitation (i.e., whether it is monopole, or dipole, or quadrupole, etc.).

Compared with the shear-type of guided modes, the "compressional mode" shows similar dispersion characteristics. The compressional mode refers to so called "leaky-P" waves generated by an acoustic source (monopole, dipole, or quadrupole, see Tang and Cheng, 2004; Tang et al., 2005) in a slow formation whose shear velocity is greater than borehole fluid velocity. The wave is a leaky because, when the formation shear-wave velocity falls below the borehole fluid velocity, a portion of the compressional wave energy coverts to shear and radiates into the formation, the attenuation due to the radiation loss causing dispersion of the waves traveling along borehole. At low frequencies, the waves travel at formation P-wave velocity. At high-frequencies, the wave's velocity approaches borehole fluid velocity. Between the two frequency limits, the wave's phase dispersion curve monotonically changes with frequency depending on various parameters of the borehole wave guide.

Summarizing the above elaborations, we see that the common dispersion characteristics for a (shear- or compressional-type of) guided wave mode are: 1) the dispersion curve is bounded by its low- and high-frequency limits; 2) the curve monotonically changes with frequency between the two limits; and 3), the rate of change is different for different waveguide structure and wave type. Based on the characteristics, we find that the following mathematical function, called hyper tangent function, can be used to mimic the guided-wave dispersion characteristics. This simple function, in terms of the wave slowness and four variable parameters, is given by $$S(\omega) = S_0 + \delta S \cdot \tan h(x\omega - y) \tag{5}$$

Similar to the guided-wave dispersion characteristics, the slowness curve is bounded by its low- and high-frequency limits, as respectively given by $$S(\omega) = \begin{cases} S_0 - \delta S, & \omega \to 0 \\ S_0 - \delta S, & \omega \to \infty \end{cases} \tag{6}$$

Thus $S_0$ and $\delta S$ parameters determine these two slowness limits As frequency increases, the hyper tangent function curve monotonically increases from its low-frequency limit to high-frequency limit The other two parameters, x and y, determine how the curve changes with frequency between the two limits The x parameter, being a frequency multiplier, determines how fast the curve changes with frequency, while the y parameter determines the location of the fast changing portion of the curve on the frequency axis.

With the four parameter function, we want to fit the dispersion characteristics of a guide wave mode, regardless of how many "model" parameters are related to the guided wave. With the functional form of equation (5) mimicking the global trend of the dispersion characteristics, the $S_0$ and $\delta S$ parameters move and stretch the theoretical curve along the slowness axis, while the x and y parameters move and stretch the curve along the frequency axis, providing a wide range of flexibility to fit the dispersion data. The curve fitting is done by minimizing the following objective function constructed as the misfit error between the theoretical curve and dispersion data:

$$E(S_0, \delta S, x, y) = \int_\Omega [S(\omega; S_0, \delta S, x, y) - S_d(\omega)]^2 d\omega \tag{7}$$

where $S_d$ is the dispersion data calculated from equation (3) and the S is the theoretical dispersion curve given by equation (5). The minimization is done over the frequency range $\Omega$ of the measured data. Proper weighting of the data $S_d$ over $\Omega$ can also be applied. For example, data points in $S_d$ with exceptionally large fitting errors are considered as outliers and are weighted down, or excluded.

Various minimization algorithms can be used. For actual data processing, we use a hybrid global minimization algorithm. To start the minimization, we use a global minimization method to find approximate values for the four parameters in equation (6). The advantage of using global minimization, as compared with using a local minimization method, is that no initial parameter values are needed in the former method. We use a very fast simulated annealing method (Ingber, L., 1989, Very fast simulated reannealing: *Journal of Math. Computation*, 12, 967-973; Chunduru, R. K., Sen, M. K., and Stoffa, P. L., 1996, 2-d resistivity inversion using spline parameterization and simulated annealing: *Geophysics*, 61, 151-161) and relax its convergence criterion (e.g., by setting a relatively large error tolerance), which, together with the simple function calculation (equation (5)), allow for obtaining the approximate parameter values fast and efficiently. Then, using the approximate values as initial guess in a local minimization method, e.g., the simplex method (Press, W. H., Flannery, B. P., Teukosky, S. A., and Vetterling W. T., 1989, *Numerical Recipes*, Cambridge University Press, Cambridge, UK), we refine the parameter values by finding the minimum of objective function in the vicinity of the given initial values. Because we use the global method to provide an initial guess, the located minimum, in case multiple minima exist in the parameter space, should be the global minimum of the objective function. The final parameter values that minimize the misfit error are output as the appropriate function parameters that best describe the dispersion characteristics of the data.

For acoustic data processing of the guided waves, a primary focus is to obtain the true formation slowness. This formation slowness can be obtained from the low-frequency end of the fitted curve, as given by $$S(\omega_l) = S_0 + \delta S \cdot \tan h(x \cdot \omega_l - y), \tag{8}$$

where $\omega_l$ is denoted the low-frequency point of the dispersion data (i.e., the lowest frequency of the received acoustic energy and, thus, the lowest frequency of the acoustic waveform data). In general, a borehole penetrating an earth formation acts as a waveguide, which cuts off transmission of acoustic waves having a frequency below the cut-off frequency. If the low-frequency portion of the data is close to the cut-off frequency, then the slowness given above is very close to its low-frequency limit given in equations (6). If, however, the frequency range of the data is away from the cut-off frequency, then the low-frequency limit may give an over-extrapolated estimation. In this case, equation (8) provides a closest possible estimation of the formation slowness value. In comparison, the semblance method may suffer from severe dispersion effect when the data frequency range is away from the cut-off frequency.

Notice that the fitting curve function (e.g., equation (5)) is not unique. Other functional forms, as along as they mimic the global trend of the dispersion characteristics, can also be used. For example, we found that the fitting function $$S(\omega) = S_0 + \delta S \cdot \mathrm{atan}(x\omega - y) \tag{9}$$

where atan represents the arc tangent function, can also be used to fit the dispersion data, for which the estimated formation slowness is given by $$S(\omega_l) = S_0 + \delta S \cdot \mathrm{atan}(x \cdot \omega_l - y) \tag{10}$$

Comparing this fitting function with the previous function, one will see that the current function shows a "steeper" variation toward the cut-off frequency and may provide a better fit to data in certain scenarios (e.g., an altered formation tends to have a steeper dispersion curve than an unaltered formation). In actual data processing, the two functions can both be use to fit the data. Whether to use equation (8) or (10) for the estimated formation slowness depends on which function, equation (5) or (9), gives a better fit (or smaller fitting error). In most cases, the difference between the two estimated slowness values is well within the processing error range and is practically negligible, although in some situations the difference is noticeable.

Data Processing Examples

The above curve-fitting dispersion analysis method has been applied to process various acoustic data sets acquired from both wireline and LWD measurements. In this section, we demonstrate the validity and effectiveness of the method using synthetic and field data examples. We describe the synthetic testing example first.

Synthetic Data

Testing with synthetic data is to verify whether the new technique can fit the exact model dispersion data and recover the known input model parameter. We use a synthetic dipole flexural waveform data set for the test because correcting dispersion effect in wireline dipole logging data has been an important topic for more than two decades. The synthetic model consists of a water-filled borehole of 0.2 m diameter and an elastic formation. The formation density, P- and S-wave velocities are 2.4 g/cc, 3200 m/s, and 1604 m/s, respectively. The synthetic data and test results are discussed below.

Figure 1A:
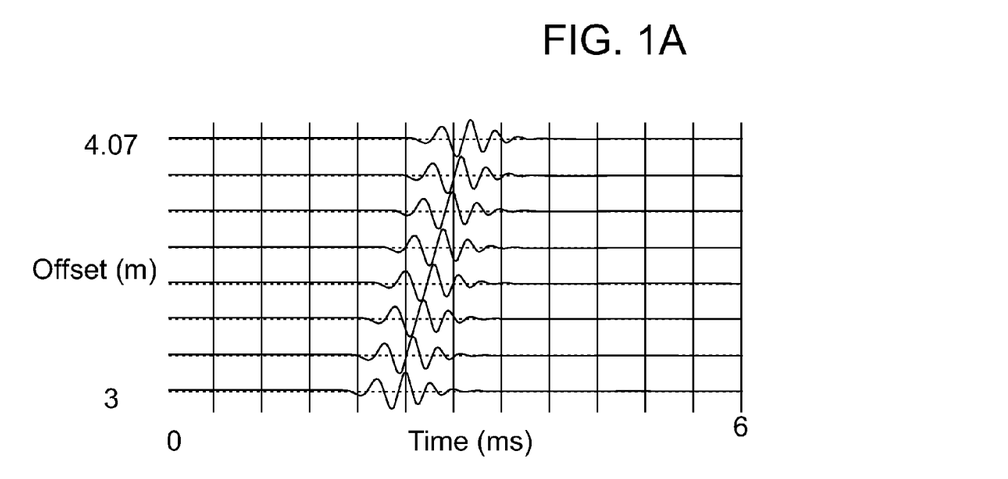
FIGS. 1A, 1B and 1C, collectively referred to herein as FIG. 1, depict aspects of synthetic dipole acoustic array waveform data.
Figure 1B:
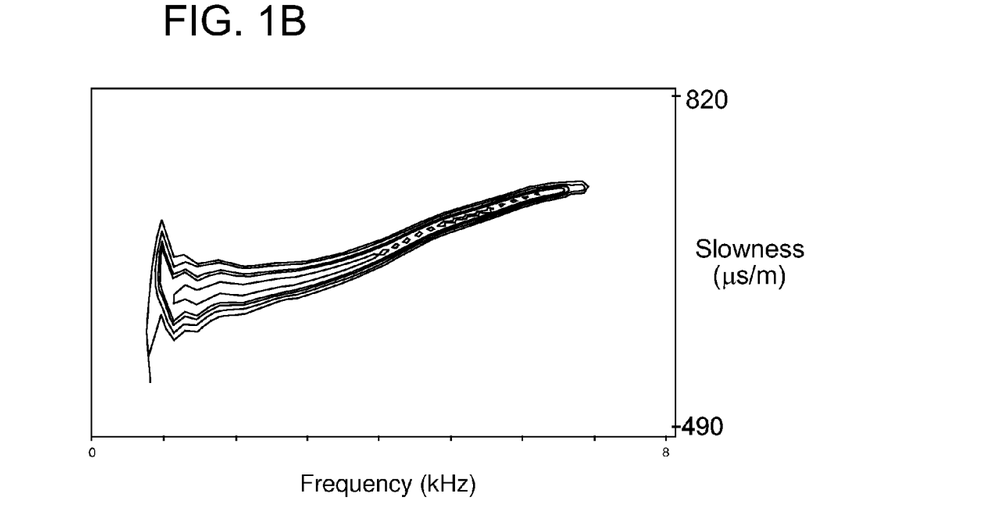
Figure 1C:
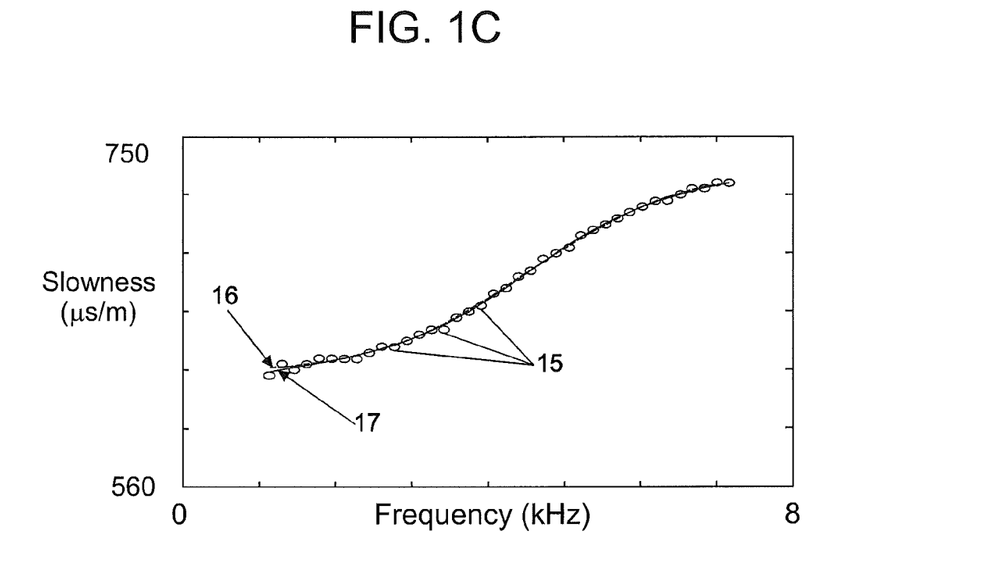

FIG. 1A shows the synthetic array dipole waveform data calculated with a 3-kHz center frequency wavelet. The receiver array consists of eight receivers, with the source-to-first receiver offset and receiver spacing being 3 m and 0.1524 m, respectively. The array data is then used in equation (3) to calculate the slowness-frequency coherence function in the frequency range of 0-8 kHz and slowness range of 490-820 µs/m. FIG. 1B shows the variable-density (VD) image of the coherence function, with the peak of the function (center of the VD image) delineating the dispersion characteristic of the synthetic data, which is the typical dipole-flexural wave dispersion with the slowness increasing with increasing frequency. At each frequency, the peak of the function is picked to yield the dispersion data shown in FIG. 1C (as markers 15). As can be seen from FIG. 1C, even with the synthetic data, the numerically processed dispersion data still show some noticeable scatters, especially toward the low-frequency end where wave amplitude is small.

The dispersion data is fitted separately with the hyper tangent function (equation (5)) and with the arc tangent function (equation (9)). The respective fitted curves are displayed in FIG. 1C, curve 16 corresponding to the hyper tangent fitting function and curve 17 corresponding to the arc tangent fitting function. The two curves are almost indistinguishable, both fitting the data equally well. The only minor difference is at the low-frequency end, where the arc tangent curve value is about 0.4% smaller than the hyper tangent curve value. The latter value is 623.52 µs/m, in almost exact agreement with the true formation shear slowness value of 623.35 µs/m. Comparing the low-frequency behaviors of the two fitting curves with the synthetic data confirms the earlier discussion about the usage of the fitting functions. That is, the arc tangent function is better suited for the dispersion data that shows variations toward low-frequencies, while the hyper tangent function is more appropriate if the low-frequency trend of the dispersion data is flat. This synthetic testing example demonstrates that the multiple-parameter dispersion curve of a guided wave can indeed be well fit with the proposed simple function that has only four fitting parameters.

Wireline Dipole Data

Next we discuss an important application of the new method to wireline dipole acoustic data. In wireline acoustic logging, dipole flexural waves are used to measure formation shear-wave slowness, especially for slow formations whose shear slowness is slower than the acoustic slowness of the borehole fluid. A common characteristic of the dipole wave modes is dispersion, as have been demonstrated in the synthetic example of FIG. 1. Correcting the dispersion effect in the dipole wave slowness is important for improving the accuracy of formation shear-wave slowness.

Figures 2A, 2B:
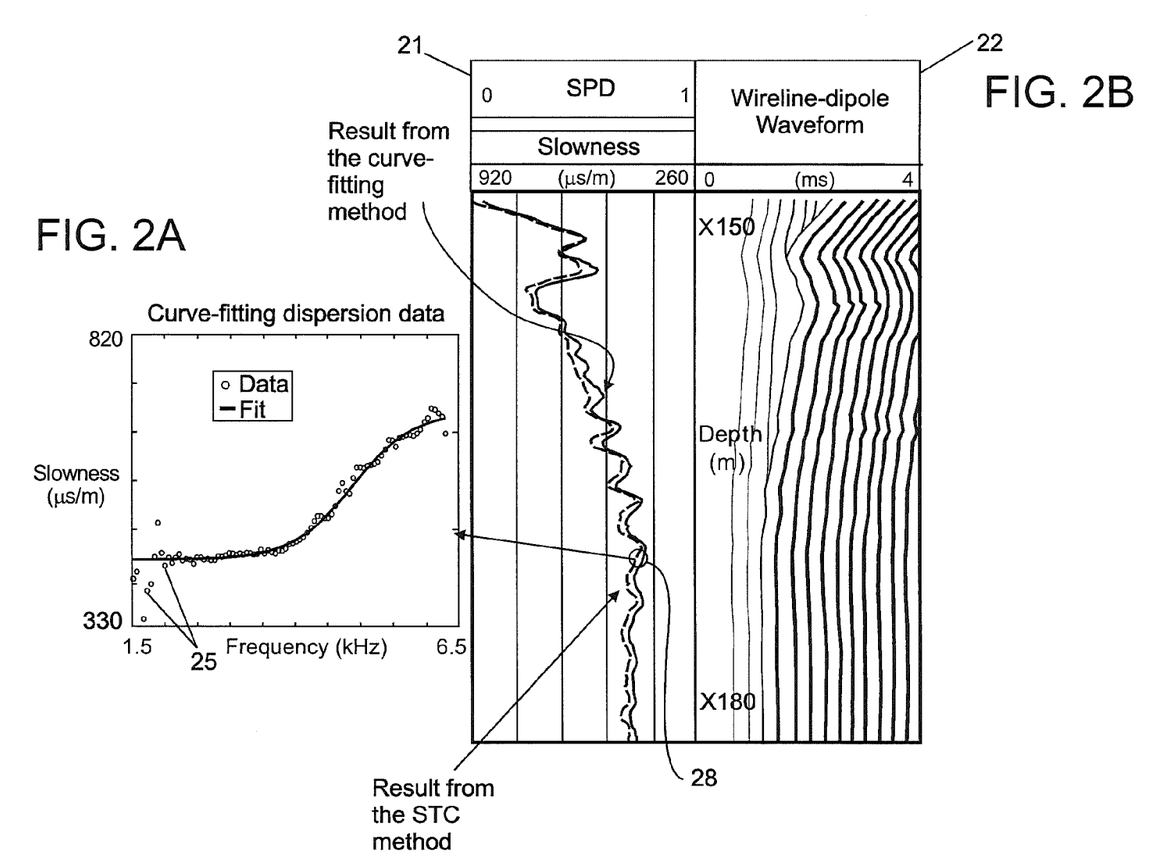
FIGS. 2A, and 2B, collectively referred to herein as FIG. 2, depict aspects of wireline acoustic logging data.

FIG. 2 shows the comparison of the dipole data processing results from the curve-fitting method and the traditional semblance, or slowness-time-coherence (STC), method. The formation shear slowness in this example varies within a wide range between 260 and 920 µs/m. Panel 22 of the FIG. 2B shows, in a VD display, the dipole waveforms with good data quality (only data from a first receiver of an eight-receiver array is displayed). The data processing results are displayed in Panel 21 of FIG. 2B, overlain with VD image display of a slowness probability density function, denoted by SPD. The SPD function is calculated using $$SPD(s) = \frac{1}{\omega_M - \omega_1} \int_{\omega_1}^{\omega_M} \exp\left\{-\left[\frac{s - S_d(\omega)}{\sigma_s}\right]^2\right\} d\omega, \quad (11)$$

where M is the number of frequency points (from $\omega_1$ to $\omega_M$) in the dispersion data $S_d$, and $\sigma_s$ is the standard deviation of the data $S_d$ over the frequency points. Because of the analytical property of the exponential function, called kernel function, the SPD calculated with this kernel density estimator has less abrupt scattering compared to that calculated using the conventional histogram method (e.g., Huang, X., and Yin, H., 2005, A data-driven approach to extract shear and compressional slowness from dispersive waveform data: 75th Annual International Meeting, SEG, Expanded Abstracts, 384-387). Like the histogram method, if the slowness dispersion data has a flat trend toward at low-frequencies, the SPD function will reach a peak toward the low-frequency end. Detecting the edge of the peak may also provide an estimate of the formation slowness. The edge of the peak is depicted as the curve labeled as the "Result from the curve-fitting method" shown in FIGS. 2B, 3B, and 4B.

The processed slowness curves, along with the SPD data, can now be compared. The slowness curve from the STC processing, displayed in green, shows consistently higher values than the slowness from curve-fitting (red curve), with an average percentage difference about 3%. The difference between the two curves would be the amount of dispersion correction that is needed to obtain the formation shear slowness from the STC result. This needs verification. Comparing the curve-fitting slowness with the SPD data provides the verification. As shown in Panel 21 of FIG. 2B, this slowness curve tracks the edge of the SPD function quite well. We recall that the method of Huang and Yin (2005) estimates the formation slowness by detecting the edge of the histogram, which, in our case, is the SPD function shown in Panel 21. Therefore, the curve-fitting method and the histogram edge detection method will give similar results for this good quality wireline dipole data.

To view how the simple fitting method fits the field data, we plot the actual dispersion data (markers 25) and the fitted curve in FIG. 2A. A small circle 28 in Panel 21 of FIG. 2B indicates the depth where this data is from. In the frequency range of 1.5-6.5 kHz covered by the data's spectral content, the fit to data is excellent from low to high frequencies, despite some large scatters at the low-frequency end. The dispersion data clearly shows a flat portion in the low-frequency range. As discussed earlier, the hyper tangent function (equation (5)), instead of the arc tangent function (equation (9)), should be used to better fit the flat portion of the data, which is the fitted curve in panel 21 of FIG. 2B. In this case, estimating formation shear slowness from the low-frequency limit (equation (6)), or from a starting frequency with small data scatter (equation (7)), of the fitting function, will give practically the same result.

LWD Leaky-P Wave Data

We now discuss the application of the new method to LWD acoustic data processing. LWD acoustic technology has undergone rapid development in recent years and processing the LWD data presents many challenges and opportunities for developing new techniques. One of the challenges is extracting compressional wave slowness from shallow, unconsolidated, and acoustically very slow formations frequently encountered in drilling a deep-water reservoir. Similar to wireline logging (e.g., Hornby and Pasternark, 2000), the only effective way to obtain the formation P-wave velocity of a very slow formation is to excite and measure the "leaky-P" waves in the low-frequency range (Tang et al., 2005). As mentioned previously, leak-P waves are dispersive. The dispersion effect is especially pronounced in this LWD situation. This scenario provides an opportunity to test the new dispersive data processing technique.

Figures 3A, 3B:
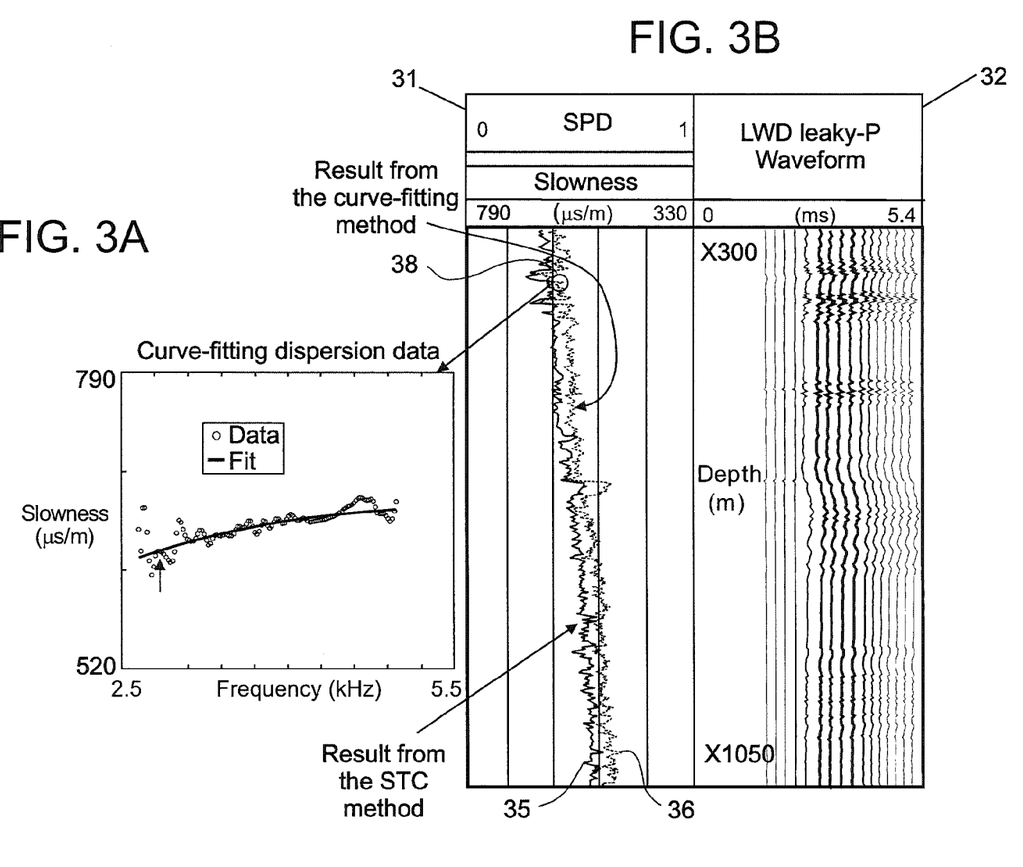
FIGS. 3A and 3B, collectively referred to herein as FIG. 3, depict aspects of LWD leaky-P wave data.

An LWD acoustic data set is shown in FIG. 3B (panel 32) over a 760 m depth section (only data from a first receiver of a six receiver array is displayed). The subject formation is a shallow, unconsolidated shale formation. The waveforms show a dominant leaky-P wave event with a center frequency about 3-4 kHz. A weaker tool wave with invariant arrival time is also present ahead of the leaky-P wave. (Although the tool has an acoustic isolator, the isolator is designated to attenuate tool waves around 10 kHz and therefore does not significantly attenuate the low-frequency tool wave.) Drilling noise is present but is small because the drilling was "quiet" in this soft formation. The data are processed using the conventional STC method and the new curve-fitting method. The results are shown in Panel 31 of FIG. 3B.

Comparison of the processed slowness curves reveals significant dispersion effects of the data. The STC slowness curve 35 is about 7% slower than the curve-fitting slowness curve 36, the difference exceeding 10% in some intervals (e.g., around X610m). The validity of the curve-fitting result is again supported by the SPD function displayed in the background of the curves. This function shows a well defined edge and the curve-fitting slowness curve tracks the edge quite well. Again, for this good quality LWD data, the edge-detection method and the new method give similar results.

An example of detailed curve-fitting of the actual leak-P wave dispersion data is displayed in FIG. 3A. A small circle 38 in Panel 31 of FIG. 3B indicates the depth where the data is from. Despite scatters in the data that are caused by noise, the data shows a clear dispersion trend, with slowness increasing as frequency increases. This explains that the dispersion is the cause of difference between the STC result and the curve-fitting result. The dispersion data is fit with the arc tangent function (equation (9)) because the data trend is quite variable toward low frequencies, although the hyper tangent function, by using its medium frequency range, would fit the data equally well. The fitted dispersion, however, does not reach a low-frequency limit, presumably because the small low-frequency wave amplitude is contaminated by drilling noise. Equation (10) is used to estimate the formation P-wave slowness by selecting a starting frequency whose neighborhood has a small data variance relative to the fitted curve, as pointed by an arrow in the figure. The slowness picked this way tracks the edge of the SPD function quite well (Panel 31 of FIG. 3B).

LWD Quadrupole Shear Wave Data

As a final application example, we apply the new technique to process LWD quadrupole shear wave data acquired in a noisy drilling environment. A significant recent advancement in LWD acoustics is the development of quadrupole shear-wave technology. The theoretical foundation and tool development are elaborated in a series of technical publications (e.g., Tang et al., 2002; Dubinsky, V., Tang, X., Bolshakov, A., and Patterson, D., 2003, Engineering aspects of LWD quadrupole measurements and field test results, Paper 84248, SPE Annual Technical Conference and Exhibition; Tang, X. M., Dubinsky, V., Wang, T., Bolshakov, A., and Patterson, D., 2003, Shear-velocity measurement in the Logging While-Drilling environment: Modeling and field evaluations: Petrophysics, 44, 79-90; Tang, X. M., Dubinsky, V., and Patterson, D., 2006, Development of a low-frequency LWD quadrupole shear-wave technology to improve quality of formation shear velocity measurement, Paper 102335, SPE Annual Technical Conference and Exhibition). The main advantages of LWD quadrupole waves are 1), the wave attains formation shear slowness at low frequencies and 2), tool quadrupole waves are not excited in the low-frequency range. The LWD quadrupole waves, however, can be quite dispersive, especially when a heavy mud is used in drilling. A solution for minimizing the dispersion effect is to drive the measurement to the low frequency range (Tang et al., 2006). An adverse effect is that the drilling noise can also become quite large toward low frequencies. The situation presents a challenge whether the curve-fitting technique is still applicable in this noisy LWD environment.

Figures 4A, 4B:
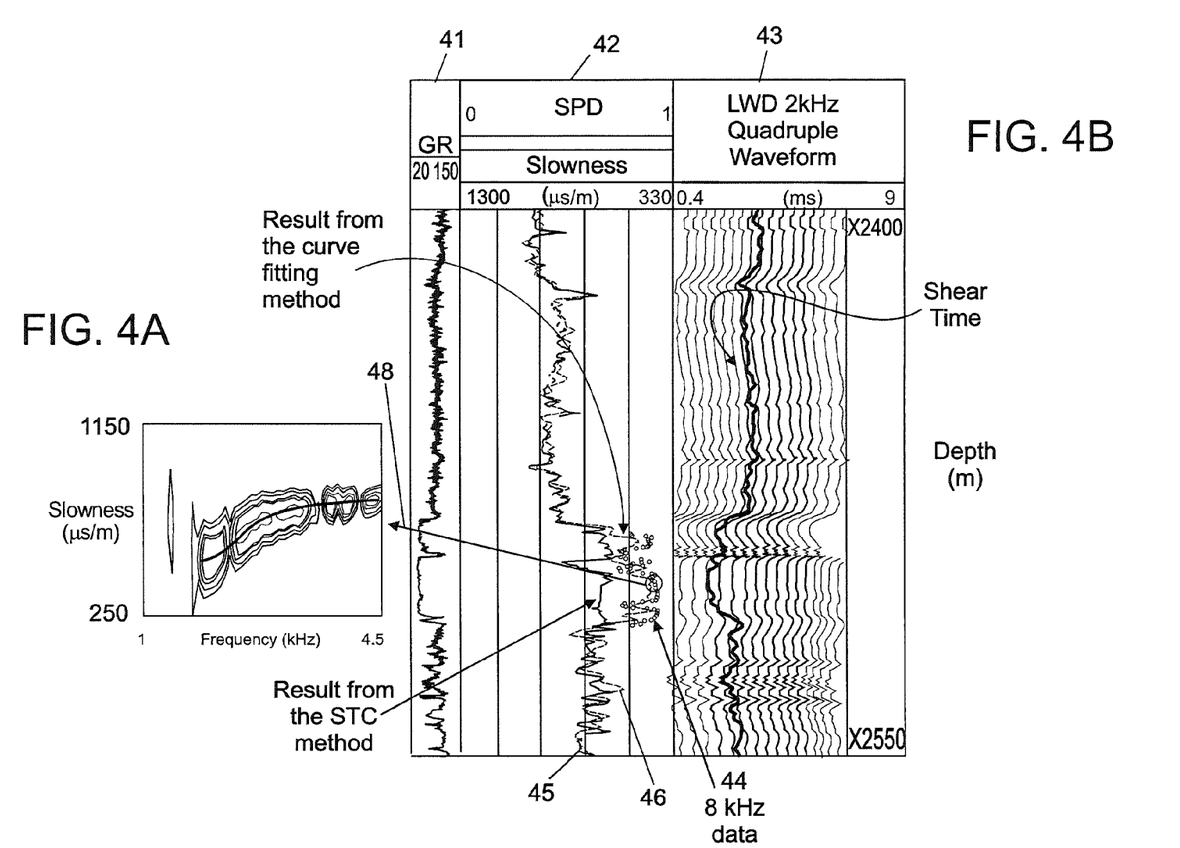
FIGS. 4A and 4B, collectively referred to herein as FIG. 4, depict aspects of LWD quadrupole shear wave data.

FIG. 4B (panel 43) shows an LWD quadrupole data set acquired down to the 2 kHz frequency range (only data from a first receiver of a six receiver array is displayed). The subject formation consists of some fast sandstone intervals sandwiched in slow shale formations, the lithology being indicated by the gamma-ray (GR) log curve in panel 41 of FIG. 4B. As predicted by the theory, there is no tool quadrupole wave in the data. However, the background drilling noise is quite significant. The data is processed with the standard STC method (curve 45) and the curve-fitting method (curve 46). The processed slowness curves are shown in panel 42 of FIG. 4B together with the VD image of the SPD function calculated from the data. An interesting observation is that the two slowness curves differ only slightly in slow shale, but greatly in fast sand formations. These observed phenomena are closely related to the operation principle of the LWD quadrupole shear technology and are discussed in the following.

The slow-formation processing results indicate that the low-frequency LWD quadrupole wave indeed attains the formation shear slowness. This is evidenced by the small difference between the slowness results from the non-dispersive STC method and the dispersive curve-fitting method, although the small difference suggests that the wave is still minimally dispersive toward low frequencies. It is also noted that the curve-fitting slowness curve, although it follows the main feature of the SPD image, does not track the edge of the image very well. This happens because the SPD image calculated with the noisy LWD data is smeared. The image also shows many spurious events that have high SPD values but incorrect slowness values. For this data set, detecting the edge of the SPD image for formation slowness estimation will be difficult.

Of special interest is the result in the fast formation intervals, where the STC and curve-fitting results show substantial difference. This difference relates to the LWD quadrupole wave characteristics in fast formations. Like (wireline or LWD) monopole and dipole shear wave modes in the presence of a fast formation, the quadrupole source can excite an infinite number of wave modes along the frequency axis. However, for the frequency range used in downhole measurements, only one or two such modes are encountered. Although the first quadrupole mode also attains the formation shear slowness at its low-frequency limit, or cut-off frequency, this mode is strongly dispersive away from the cut-off frequency. Consequently, LWD quadrupole shear measurements in fast formations almost exclusively use the second wave mode around the 8-kHz frequency range (Tang et al., 2003), where the quadrupole wave attains the formation shear slowness and has minimal dispersion. (For comparison, the 8-kHz quadrupole slowness data (markers 44) is plotted in panel 42 of FIG. 4B.) The fast formation results show that it is possible to obtain the shear slowness from the first quadrupole mode using the curve-fitting method.

FIG. 4A reveals the strong dispersion characteristic of the first quadrupole wave mode in the fast formation. A small circle (associated with arrow 48) in panel 42 of FIG. 4B indicates the depth where the data for FIG. 4A is from. In a narrow frequency range of 2-4.5 kHz, the slowness corresponding to peak coherence features increases almost by a factor of two. Such strong dispersion often produces an "Airy phase" phenomenon in time domain waveform data, causing the wave energy associated with the large-amplitude Airy phase to lag significantly behind the formation shear arrival time. This explains why the slowness for STC processing, which is the slowness of the dominant traveling wave, differs significantly from the 8-kHz quadrupole shear slowness. The slowness data from picking peak values of the coherence function is fitted with the hyper tangent function (solid curve in FIG. 4A). The fitted curve tracks the peak coherence image very well. Picking the slowness value at the low-frequency end of the fitted curve gives the curve-fitting slowness curve in panel 42 of FIG. 4B. The slowness data is reasonable agreement with the 8 kHz quadrupole data, considering the strong noise contamination of the LWD data. The shear-wave travel time curve (panel 43 of FIG. 4B) calculated from the curve-fitting slowness tracks the wave onset quite well. This data analysis and comparison example not only verifies the predicted LWD quadrupole characteristics in fast formations, but also demonstrates that it is possible to determine formation shear slowness from measuring low-frequency quadrupole wave data for both fast and slow formations.

Further Discussion

We have developed a curve-fitting dispersive processing technique and validated the technique using the guided-wave data from wireline and LWD borehole acoustic measurements. This technique can be extended to elastic wave modes existing in other types of waveguide structure. For example, this technique is also applicable to various guided waves in seismic exploration, where the waveguide consists of various subsurface layered structures. As shown in the theoretical development of the technique, the foundation for the simple curve-fitting method is the monotonic variation of the guided-wave's phase dispersion curve. In fact, the typical guided waves encountered in seismic exploration, e.g., Rayleigh and Love waves guided along sedimentary layers (Ewing, W. M., Jardetzky, W. S., and Press, F., 1957, *Elastic waves in layered media*: W. McGraw-Hill., New York; Lou, M., and S. Crampin, 1992, Guided-wave propagation between boreholes: The Leading Edge, 11, no. 7, 34-37) all have dispersion characteristics similar to borehole guided waves. Fitting the dispersion curve of these guided waves using the simple functions (equations (5) and (9)) will determine the dispersion characteristics of these waves.

Figure 5A:
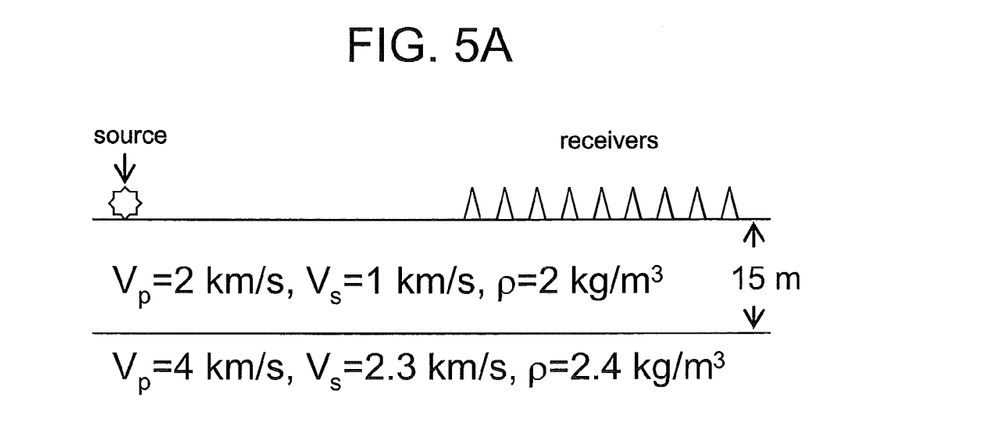
FIGS. 5A, 5B and 5C, collectively referred to herein as FIG. 5, depict aspects of surface seismic data.
Figure 5B:
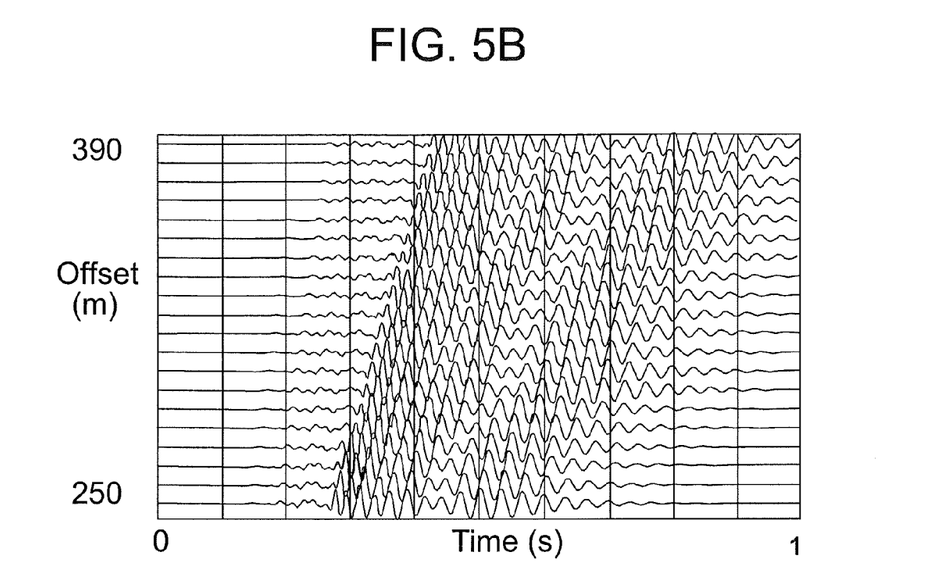
Figure 5C:
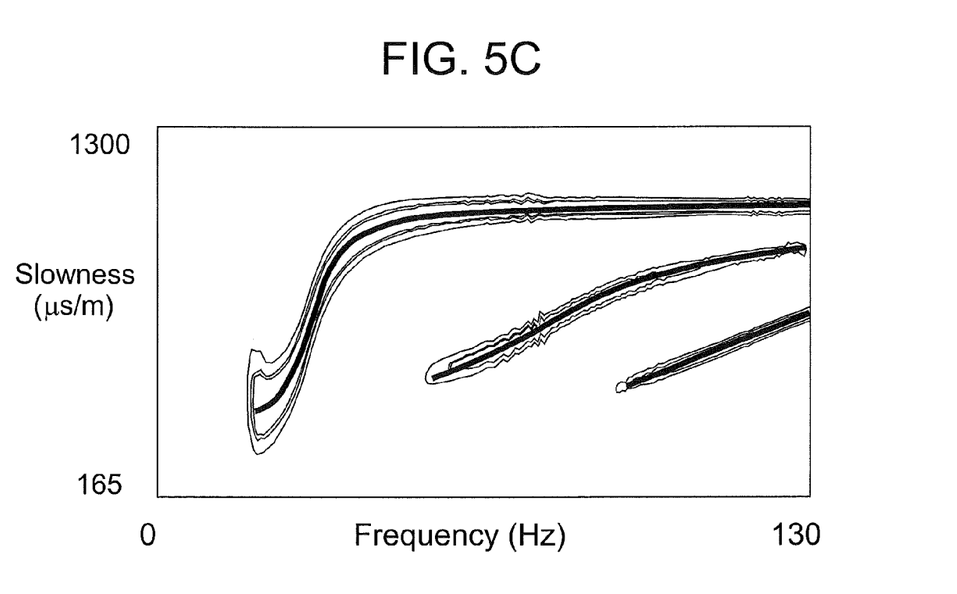

We use a synthetic modeling example to demonstrate the applicability of the technique for seismic exploration problems. FIG. 5A illustrates a simple waveguide structure consisting of an elastic layer overlaying an elastic half space; model parameters such as P and S wave velocities, density, as well as layer thickness, are also given in the figure. A vertical force source with a 40-Hz center frequency source wavelet is applied at the surface to actuate wave propagation; an array of receivers is placed along the surface to receive the wave signals. FIG. 5B shows the synthetic wave data for source-receiver offsets ranging from 250 to 390 m. The slowness-frequency coherence of the data is displayed in FIG. 5C, which shows three dispersive modes existing in the wave excitation frequency range of 0-130 Hz. These wave modes are classical Rayleigh waves in a layered waveguide, as studied by many authors (e.g., Ewing et al., 1957). The slowness data picked from the peak coherence region is now fit with a simple fitting function (equation (9)). The fitted curves are overlain with the coherence image, showing very good fit to the peak coherence region of all three wave modes. This example demonstrates that, any dispersive wave mode, as long as its dispersion curve monotonically varies in the frequency range of interest, can be processed with the technique.

Figure 6:
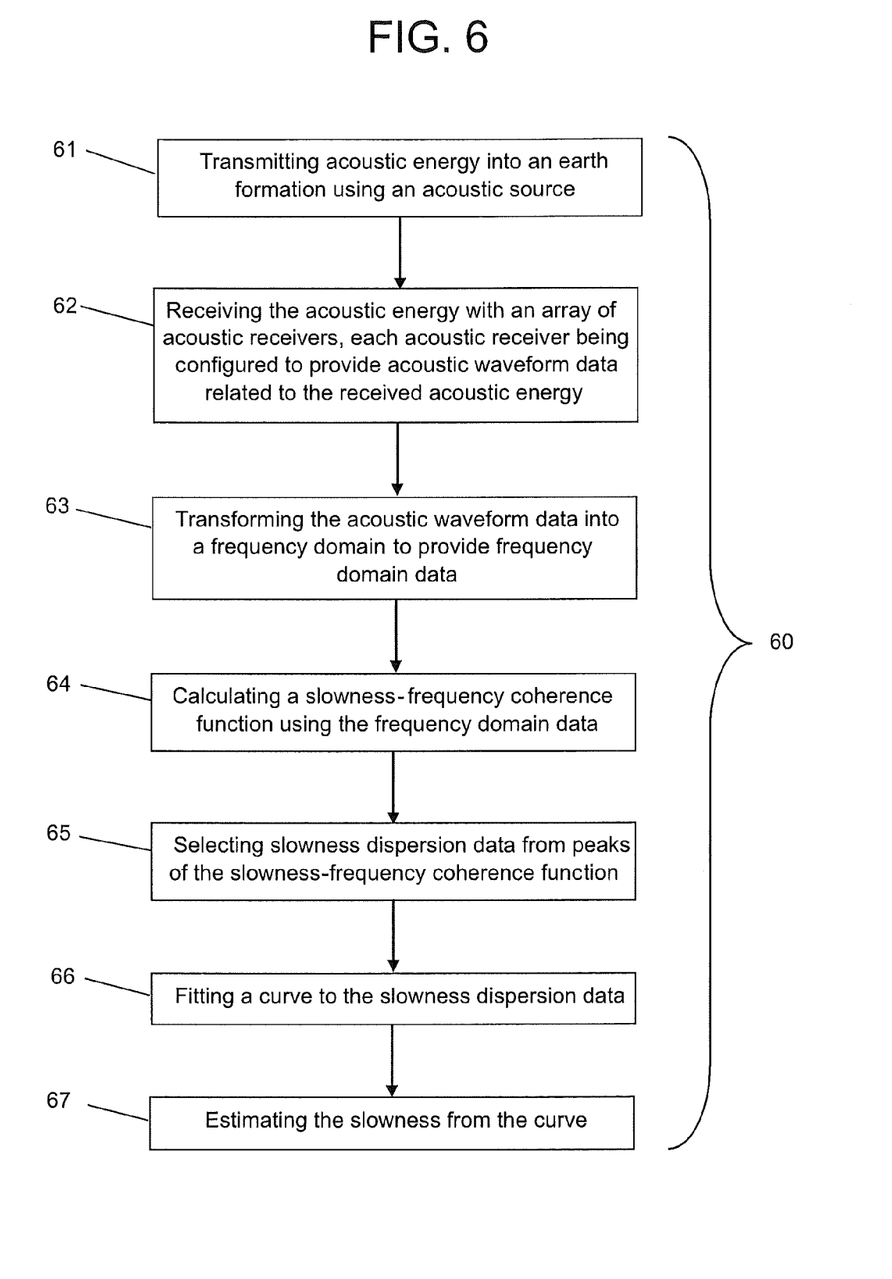
FIG. 6 presents one example of a method for estimating a slowness of an earth formation.

FIG. 6 presents one example of a method 60 for estimating a slowness of an earth formation. The term "slowness" relates to an inverse of speed of an acoustic wave traveling in the earth formation, generally measured in microseconds per foot. The method 60 calls for (step 61) transmitting acoustic energy into the earth formation using an acoustic source. Further, the method 60 calls for (step 62) receiving the acoustic energy with an array of acoustic receivers, each acoustic receiver being configured to provide acoustic waveform data related to the received acoustic energy. Further, the method 60 calls for (step 63) transforming the acoustic waveform data into a frequency domain to provide frequency domain data. Further, the method 60 calls for (step 64) calculating a slowness-frequency coherence function using the frequency domain data. Further, the method 60 calls for (step 65) selecting slowness dispersion data from peaks of the slowness-frequency coherence function. Further, the method 60 calls for (step 66) fitting a curve to the slowness dispersion data. Further, the method 60 calls for step 67) estimating the slowness from the curve. A low frequency value of the curve can determine whether the slowness is for compressional aspects or shear aspects of the earth formation. In addition, dispersion characteristics of the acoustic wave are delineated by the variation of the curve.

Figure 7:
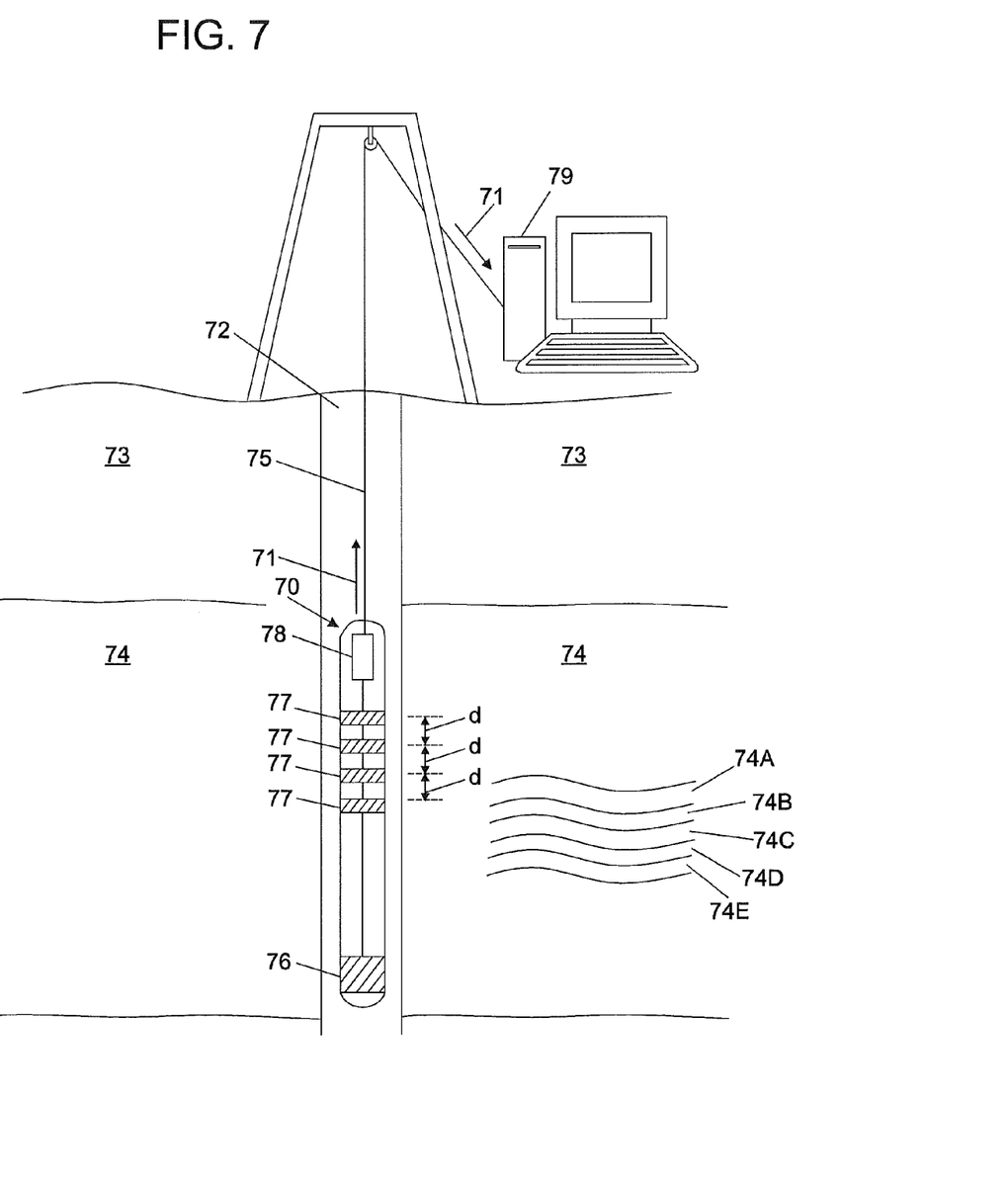
FIG. 7 illustrates an exemplary embodiment of a logging instrument in a borehole penetrating the earth.

Referring to FIG. 7, a well logging instrument (or tool) 70 used for implementing the techniques disclosed herein is shown disposed in a borehole 72. The borehole 72 is drilled through earth 73 and penetrates a formation 74, which include various formation layers 74A-74E. In one embodiment, the logging instrument 70 is lowered into and withdrawn from the borehole 72 by use of an armored electrical cable 75 or similar conveyance as is known in the art. In other embodiments, the logging instrument 70 may perform measurements of a property of the formation 74 during LWD or during a temporary halt in drilling.

In the embodiment of FIG. 7, the logging instrument 70 is configured to perform acoustic measurements of the formation 74. The logging instrument 70 includes at least one acoustic source 76 and an array of acoustic receivers 77. The array in FIG. 7 is a linear array and each acoustic receiver 77 in the array is spaced a distance d from an adjacent acoustic receiver 77. Thus, the acoustic receivers 77 are noted as being equally spaced. An electronic unit 78 is shown disposed at the logging instrument 70. The electronic unit 78 is configured to operate the logging instrument 70. In one embodiment, the electronic unit 78 can store acoustic waveform logging data 71 from the acoustic receivers 77 for later retrieval when the instrument 70 is removed from the borehole 72. In another embodiment, the electronic unit 78 can send the data 71, using a telemetry system, to a processing system 79 disposed as the surface of the earth 73. The processing system 79 is configured to execute instructions that implement the techniques disclosed herein.

In typical embodiments, the borehole 72 includes materials such as would be found in oil exploration, including a mixture of liquids such as water, drilling fluid, mud, oil and formation fluids that are indigenous to the various formations. It will be recognized that the various features as may be encountered in a subsurface environment may be referred to as "formation." Accordingly, it should be considered that while the term "formation" generally refers to a geologic formation of interest, that the term "formation," as used herein, may, in some instances, include any geologic points of interest (such as a survey area).

In support of the teachings herein, various analysis components may be used, including a digital system and/or an analog system. For example, the processing system 79 and the electronic unit 78 may include the digital system and/or the analog system. The system may have components such as a processor, storage media, memory, input, output, communications link (wired, wireless, acoustic, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure. The instructions may be included in at least one of hardware, software, and firmware.

Further, various other components may be included and called upon for providing for aspects of the teachings herein. For example, a power supply (e.g., at least one of a generator, a remote supply and a battery), cooling unit, heating unit, motive force (such as a translational force, propulsional force or a rotational force), magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

The term "carrier" as used herein means any device, device component, combination of devices, media and/or member that may be used to convey, house, support or otherwise facilitate the use of another device, device component, combination of devices, media and/or member. The logging tool 70 is one non-limiting example of a carrier. Other exemplary non-limiting carriers include drill strings of the coiled tube type, of the jointed pipe type and any combination or portion thereof. Other carrier examples include casing pipes, wirelines, wireline sondes, slickline sondes, drop shots, bottom-hole-assemblies, drill string inserts, modules, internal housings and substrate portions thereof.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for estimating a slowness of an earth formation, the method comprising:
   transmitting acoustic energy into the earth formation using an acoustic source;
   receiving the acoustic energy with an array of acoustic receivers, each acoustic receiver being configured to provide acoustic waveform data related to the received acoustic energy;
   transforming the acoustic waveform data into a frequency domain to provide frequency domain data;
   calculating a slowness-frequency coherence function using the frequency domain data;
   selecting slowness dispersion data from peaks of the slowness-frequency coherence function;
   fitting a curve to the slowness dispersion data; and
   estimating the slowness from the curve.

2. The method of claim 1, wherein the acoustic source comprises at least one of a monopole source, a dipole source, and a quadrupole source.

3. The method of claim 1, wherein the acoustic receivers are disposed in a linear array having approximately equal spacing between adjacent receivers.

4. The method of claim 1, wherein the acoustic source and the array of acoustic receivers are disposed at a logging tool configured to be conveyed through a borehole penetrating the earth formation.

5. The method of claim 1, wherein the acoustic waveform data comprises at least one of dipole flexural wave data, leaky-P data, and quadrupole shear wave data.

6. The method of claim 1, wherein transforming comprises performing a Fourier analysis on the data.

7. The method of claim 1, wherein calculating comprises using the following equation:

$$\rho(\omega, s) = \frac{\left|\sum_{n=1}^{N} X_n^*(\omega) e^{-i\omega(n-1)sd}\right|}{\sqrt{N \sum_{n=1}^{N} X_n^*(\omega) X_n(\omega)}}$$

where $\omega$ is angular frequency, * denotes taking the complex conjugate; the two vertical bars |•| denote taking the absolute value of the quantity inside the bars; and $X_n(\omega)$, (n=1,2, ..., N) represents the frequency domain data in a waveform of a dispersive guided wave mode obtained from the acoustic logging instrument with an array of N equally-spaced receivers; and d is spacing between the receivers.

8. The method of claim 1, wherein fitting comprises minimizing the following misfit error function between a theoretical curve and the slowness dispersion data:

$$E(S_0, \delta S, x, y) = \int_\Omega [S(\omega; S_0, \delta S, x, y) - S_d(\omega)]^2 d\omega$$

where $S_d$ is the slowness dispersion data; S is the theoretical dispersion curve; $S_o$, $\delta S$, x and y are curve fitting parameters; and the minimizing is performed over the frequency range $\Omega$ of the acoustic waveform data.

9. The method of claim 8, further comprising at least one of weighting down and excluding any $S_d$ data points having large fitting errors.

10. The method of claim 8, wherein minimizing comprises:
determining approximate values of $S_o$, $\delta S$, x, and y using a global minimization method; and
refining the values of $S_o$, $\delta S$, x, and y by finding a minimum of the misfit error function in the vicinity of the approximate values using a local minimization method and the approximate values as an initial estimate.

11. The method of claim 1, wherein the curve comprises:

$S(\omega) = S_o + \delta S \cdot \tan h(x\omega - y)$ where S represents slowness, $\omega$ represents angular frequency, and $S_o$, $\delta S$, x and y are curve fitting parameters.

12. The method of claim 1, wherein the curve comprises:

$S(\omega) = S_o + \delta S \cdot a \tan(x\omega - y)$ where S represents slowness, $\omega$ represents angular frequency, and $S_o$, $\delta S$, x and y are curve fitting parameters.

13. The method of claim 1, wherein the slowness is estimated from the following equation:

$S(\omega_l) = S_o + \delta S \cdot \tan h(x \cdot \omega_l - y)$ where S represents slowness, $\omega_l$ is a lowest frequency point of the slowness dispersion data and $S_o$, $\delta S$, x and y are curve fitting parameters.

14. The method of claim 1, wherein the slowness is estimated from the following equation:

$S(\omega_l) = S_o + \delta S \cdot a \tan(x \cdot \omega_l - y)$ where S represents slowness, $\omega_l$ is a lowest frequency point of the slowness dispersion data and $S_o$, $\delta S$, x and y are curve fitting parameters.

15. The method of claim 1, further comprising comparing the estimated slowness with an edge location of the slowness probability density function $$SPD(s) = \frac{1}{\omega_M - \omega_1} \int_{\omega_1}^{\omega_M} \exp\left\{-\left[\frac{s - S_d(\omega)}{\sigma_s}\right]^2\right\} d\omega$$

to determine a validity of the estimated slowness where s is slowness, M is the number of frequency points from $\omega_l$ to $\omega_M$ in the dispersion data $S_d$, and $\sigma_s$ is the standard deviation of the data $S_d$ over the frequency points.

16. An apparatus for estimating a slowness of an earth formation, the apparatus comprising:
an acoustic source configured to transmit acoustic energy into the earth formation;
an array of acoustic receivers configured to receive the acoustic energy, each acoustic receiver being configured to provide acoustic waveform data related to the received acoustic energy; and
a processing system configured to implement a method comprising:
transforming the acoustic waveform data into a frequency domain to provide frequency domain data;
calculating a slowness-frequency coherence function using the frequency domain data;
selecting slowness dispersion data from peaks of the slowness-frequency coherence function;
fitting a curve to the slowness dispersion data; and
estimating the slowness from the curve.

17. The apparatus of claim 16, wherein the acoustic source and the array of acoustic receivers are disposed at a carrier configured to be conveyed through a borehole penetrating the earth formation.

18. The apparatus of claim 17, wherein the carrier is a logging tool.

19. The apparatus of claim 17, wherein the carrier is configured to be conveyed by at least one of a wireline, a slickline, coiled tubing, and a drill string.

20. A computer-readable medium comprising computer-readable instructions for estimating a slowness of an earth formation which, when implemented by a processor, cause the processor to implement a method comprising:
transmitting acoustic energy into the earth formation using an acoustic source;
receiving the acoustic energy with an array of acoustic receivers, each acoustic receiver being configured to provide acoustic waveform data related to the received acoustic energy;
transforming the acoustic waveform data into a frequency domain to provide frequency domain data;
calculating a slowness-frequency coherence function using the frequency domain data;
selecting slowness dispersion data from peaks of the slowness-frequency coherence function;
fitting a curve to the slowness dispersion data; and
estimating the slowness from the curve.

* * * * *